United States Patent [19]
Mougenot et al.

[11] Patent Number: 5,461,594
[45] Date of Patent: Oct. 24, 1995

[54] METHOD OF ACQUIRING AND PROCESSING SEISMIC DATA RECORDED ON RECEIVERS DISPOSED VERTICALLY IN THE EARTH TO MONITOR THE DISPLACEMENT OF FLUIDS IN A RESERVOIR

[75] Inventors: Denis Mougenot; Yves Lafet, both of Paris, France

[73] Assignee: Compagnie Generale de Geophysique, France

[21] Appl. No.: 127,246

[22] Filed: Sep. 27, 1993

[30] Foreign Application Priority Data

Sep. 28, 1992 [FR] France .................................. 92 11530

[51] Int. Cl.$^6$ .............................. G01V 1/40; G01V 1/28
[52] U.S. Cl. .............................. 367/48; 367/57; 181/112; 364/421
[58] Field of Search .................................. 367/46, 48, 57, 367/58; 181/112; 364/421

[56] References Cited

U.S. PATENT DOCUMENTS

| | | | |
|---|---|---|---|
| 2,900,037 | 8/1959 | Ellis | 367/48 |
| 3,371,310 | 2/1968 | Silverman | 364/57 |
| 5,148,407 | 9/1992 | Haldorsen et al. | 364/421 |
| 5,191,557 | 3/1993 | Rector et al. | 367/57 |
| 5,253,217 | 10/1993 | Justice et al. | 367/46 |

FOREIGN PATENT DOCUMENTS 2153529A  12/1984  United Kingdom.
2153529    8/1985  United Kingdom.

OTHER PUBLICATIONS

R. J. Greaves et al., "New Dimensions in Geophysics for Reservoir Monitoring," SPE Formation Evaluation, vol. 6, No. 2, Jun. 1991, Texas, U.S.A., pp. 141–150.
SPE Formation Evaluation, vol. 6, No. 2, Jun. 1991, Texas, USA, pp. 141–150, R. J. Greaves et al., "New Dimensions In Geophysics For Reservoir Monitoring".
Lafet et al., Petral Tech. No. 373, pp. 19–23, Jun.–Jul. 1992; abst. only included herewith.
Fabre et al., 59th Annu. Soc. Exp. Geophys. Int. Mtg., Oct. 29, 1989, vol. 2, pp. 943–945; abst. only herewith.
Nguyen et al., Norwegian Petral Soc. Develop. Geophys. Tech . . . , Jul. 3, 1990 Proc. PTZ; abst. only herewith.
Lindsey, J. P., Leading Edge, vol. 8, #10, pp. 33–39, Oct. 1989; abst. only herewith.

Primary Examiner—Nelson Moskowitz
Attorney, Agent, or Firm—Blakely, Sokoloff, Taylor & Zafman

[57] ABSTRACT

A method of acquiring and processing seismic data for repetitive monitoring of displacement of fluids impregnating a reservoir deep in the sub-surface below the surface weathered zone comprises the steps of: making at each point of a predetermined grid on the surface a vertical axis shallow borehole in the earth above the reservoir passing through the surface weathered zone; positioning in each borehole along its vertical axis a plurality of fixed receivers adapted to be connected separately to a seismic recorder on the surface; emitting near each borehole seismic waves into the earth by means of an emitter on the surface or close to the surface near the vertical axis of the borehole; recording for each borehole by means of receivers placed in the borehole the direct incident seismic waves and the seismic waves reflected at the interfaces of deep strata of the sub-surface, each receiver providing a separate record of an incident wave and a plurality of reflected waves; and carrying out the following processing for each borehole: picking the first break of direct incident waves, horizontalizing the reflected waves, separating the reflected waves and the direct incident waves, deconvoluting receiver by receiver the reflected waves by the direct incident wave in order to obtain a 0-phase trace for each receiver, and stacking the 0-phase traces from the receivers to obtain a low coverage zero offset 0-phase trace.

2 Claims, 3 Drawing Sheets

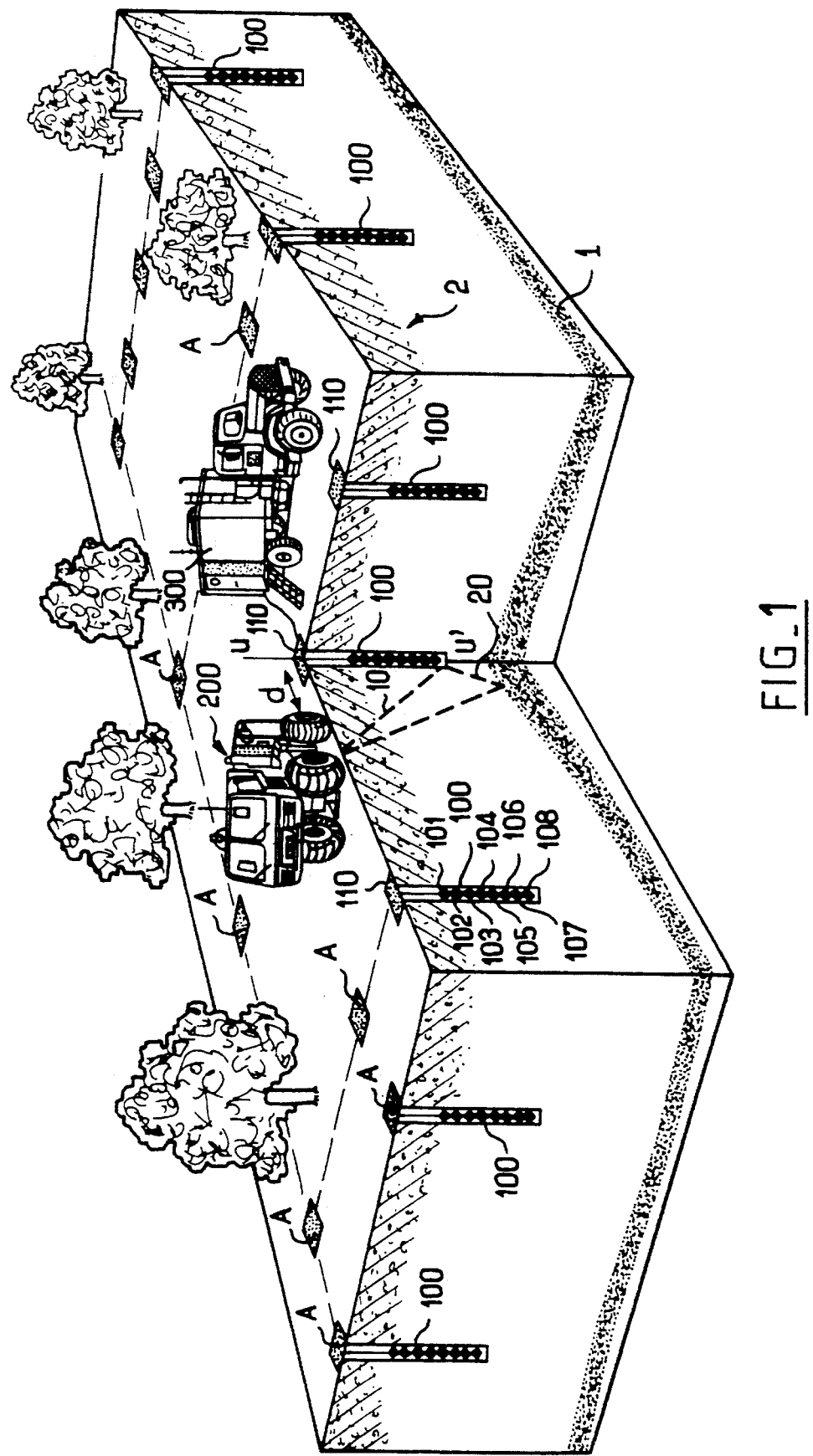
FIG_1

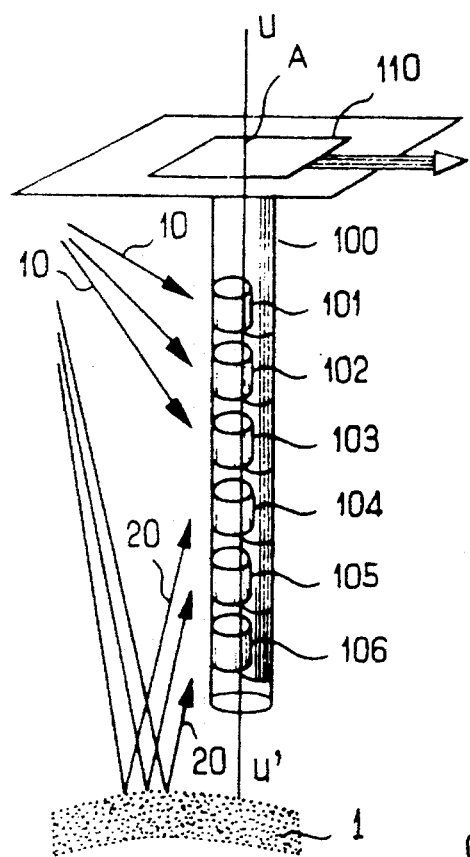
FIG_2
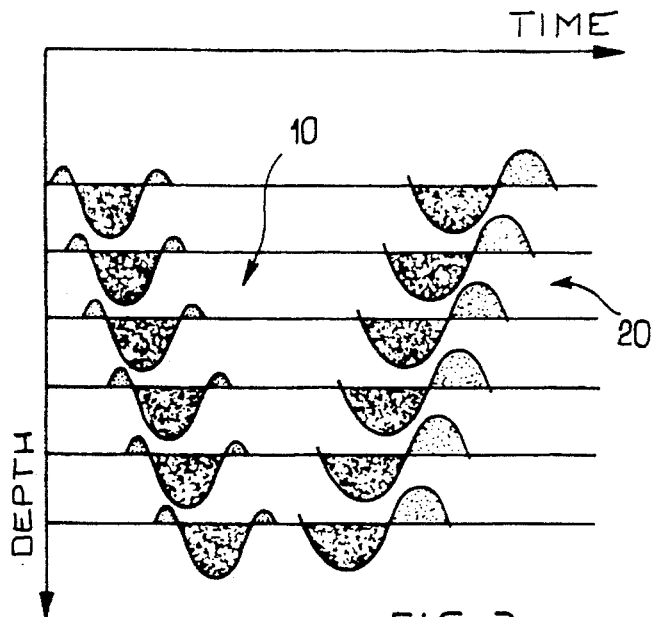
FIG_3
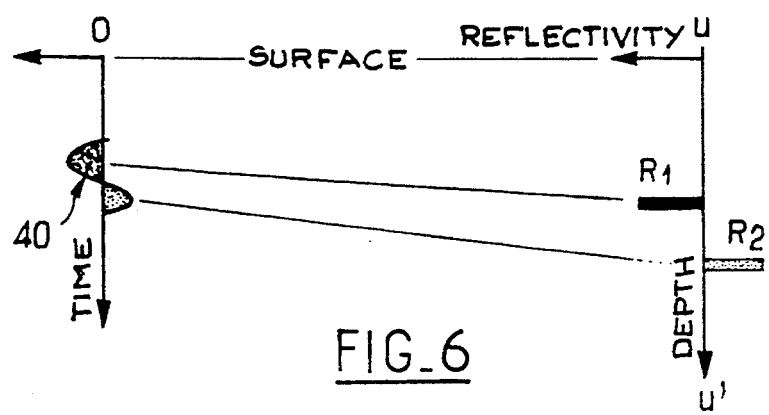
FIG_6
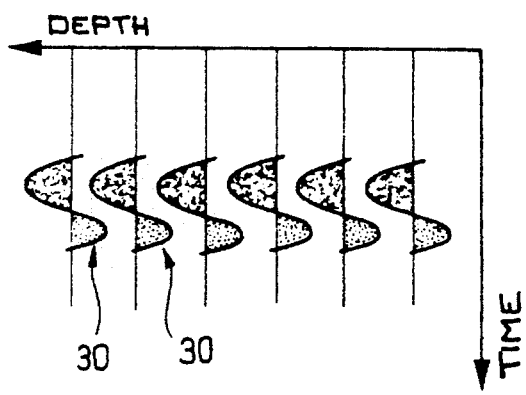
FIG_4
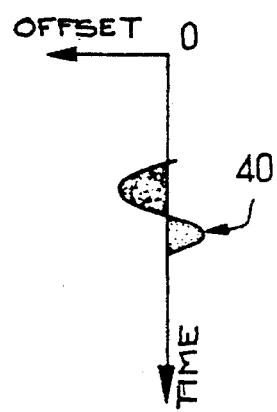
FIG_5

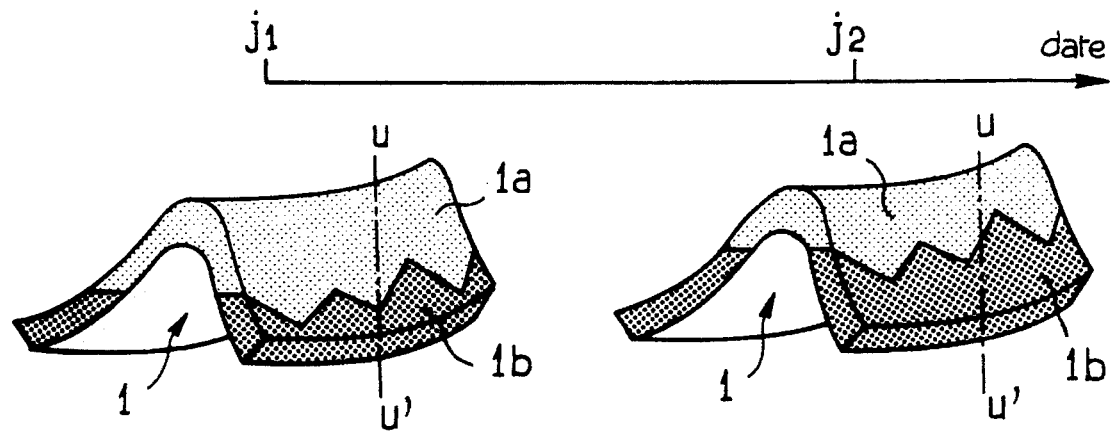
FIG_7
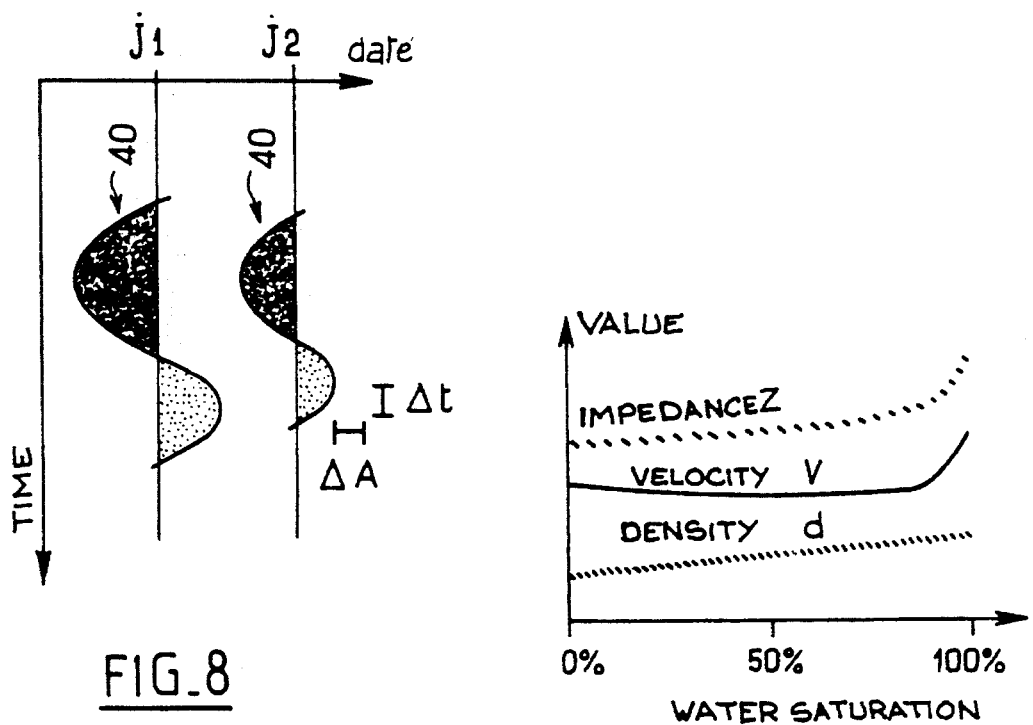
FIG_8
FIG_9

METHOD OF ACQUIRING AND PROCESSING SEISMIC DATA RECORDED ON RECEIVERS DISPOSED VERTICALLY IN THE EARTH TO MONITOR THE DISPLACEMENT OF FLUIDS IN A RESERVOIR

BACKGROUND OF THE INVENTION

1. Field of the Invention

The present invention concerns a method of acquiring and processing seismic data used in the context of repetitive monitoring of the displacement of fluids impregnating a reservoir deep in the earth below the surface weathered zone.

The invention has a particularly advantageous application in the field of applied geophysics including the collection of information on the displacement of hydrocarbons and water in an underground reservoir by repeated seismic reflection methods.

2. Description of the Prior Art

Seismic reflection enables deformation of the earth to be reconstituted by measuring the travel times of seismic waves reflected at the main interfaces. If the signal to noise ratio of the recorded data is high it is possible to measure the reflectivity of these interfaces which is proportional to the amplitude of the reflected seismic waves. It is thus possible to monitor variations in the lithology or porosity of the sub-surface and therefore to define more precisely the nature of underground hydrocarbon reservoirs, for example.

With reference to detecting fluids in such a reservoir, it so happens that under favorable conditions, meaning an unconsolidated and porous reservoir containing gas or low viscosity oil, the presence of fluids or the position of their interfaces causes amplitude anomalies or changes in configuration in the seismic reflections evidenced on a seismic profile. However, direct detection of fluids in this way is usually not possible because of the low variations in reflectivity resulting from the displacement of the fluids or because the method employed has a low resolution.

One technical solution to the above limitations of simple reflection seismic methods is repetitive monitoring, i.e. a seismic reflection recording process that is repeated at time intervals sufficient for the displacement of the fluids in the reservoir to produce detectable differences in the travel time or amplitude of the reflected waves between the successive seismic reflection profiles. By comparing two sets of recorded data the relative measurement of the reflected seismic waves is much more sensitive than a single data acquisition in the case of one-off reflection seismic methods because it shows up the displacements of the fluids without the latter being detected directly.

However, regardless of the method employed for recording the seismic reflection data, repetitive monitoring requires the repeated use of surveying devices that have to be replaced exactly in their former position and the logged data must have a high signal to noise ratio and good vertical resolution.

Prior art seismic reflection methods currently used in the case of repetitive monitoring are 2D or 3D surface methods, or cross-well or combined surface-well methods such as the vertical seismic profile (VSP). For background information on geophysical methods employed for the repetitive monitoring of fluids see "New Dimensions in Geophysics for Reservoir Monitoring, SPE formation Evaluation", June 1991, p. 141–150 (R. J. Greaves, W. B. Beydoun and B. R. Spies).

Generally speaking, all the aforementioned seismic reflection data acquisition methods are directed to obtaining a continuous image of the sub-surface (over a surface, along a line or near a borehole) and all use a multiple coverage stacking method to improve the signal to noise ratio of the logged data.

None of these methods, although familiar to the man skilled in the art, is satisfactory in the context of repetitive monitoring as they lead, on land, to problems of accessibility and seasonal variations in the properties of the surface layers of the earth and, offshore, to problems with accurate positioning for the successive surveys.

On land, 2D or 3D surface reflection seismic surveys are often difficult because they require the installation of a large number of receivers over a large area. This leads to problems of accessibility to the terrain (viability, permits) and to the immobilization or need to reposition a large quantity of data acquisition equipment. Also, surface seismic data has a moderate signal to noise ratio because the seismic noise level is high at the surface. The surface seismic noise is made up of a ground wave and an air wave. The resolution of the data is low because high frequencies are attenuated in the surface weathered zone and this is combined with filtering and with interference between the receivers placed on the ground. Also, surface seismic methods are of relatively high cost.

Borehole seismic methods supply data whose resolution and signal to noise ratio are usually suited to repetitive monitoring. However, they are difficult to use because of the limited accessibility of the boreholes and such surveys are therefore restricted to localized areas around existing boreholes.

The present invention proposes a new method of acquiring and processing seismic data suitable for repetitive seismic reflection monitoring of fluids in an underground reservoir which is directed to alleviating the drawbacks of the previously mentioned prior art seismic methods.

SUMMARY OF THE INVENTION

The present invention consists in a method of acquiring and processing seismic data for repetitive monitoring of displacement of fluids impregnating a reservoir deep in the earth below a surface weathered zone, this method comprising the steps of:

a) making at each point of a predetermined grid on the surface a vertical axis shallow borehole in the ground above the reservoir passing through the surface weathered zone, b) positioning in each borehole along its vertical axis a plurality of fixed receivers adapted to be connected separately to a seismic recorder on the surface, c) emitting near each borehole seismic waves into the earth by means of an emitter source on the surface or close to the surface near the vertical axis of said borehole, d) recording for each borehole by means of receivers placed in said borehole the direct incident seismic waves and the seismic waves reflected at the interfaces of deep strata of the sub-surface, each receiver providing a separate record of an incident wave and a plurality of reflected waves, e) carrying out the following processing for each borehole:
picking the first break of direct incident waves,
horizontalizing the reflected waves,
separating the reflected waves and the direct incident waves,
deconvoluting receiver by receiver the reflected waves by the direct incident wave in order to obtain a 0-phase trace for each receiver,
stacking the 0-phase traces from the receivers to obtain a low coverage zero offset 0-phase trace.

In this context a 0-phase trace means a trace made up of reflections whose maximal or minimal amplitudes are fitted (in terms of travel time) with the reflective interfaces of the sub-surface and whose values are proportional to the reflectivity of these interfaces. Also, a zero offset trace means a trace equivalent to that which would have been obtained using an emitter and a receiver at the same location, which is equivalent to vertical wave propagation. Further, a low coverage trace means a trace obtained by stacking a small number of traces.

In the method in accordance with the invention for acquisition and processing seismic data a measurement at each point of the grid represents one or more seismic emissions recorded separately by each of the receivers disposed vertically in the borehole at this location which extends below the surface weathered zone. The boreholes are advantageously laid out in a grid of points spaced to a greater or lesser degree to sample the reservoir in a representative manner. Note that the investigation is not dependent on the presence and availability of deep boreholes.

The object of the method in accordance with the invention is not to reconstitute a continuous image of the sub-surface at a given date but rather to obtain at each point of the grid a low coverage zero offset 0-phase trace, that is a record of the waves reflected vertically of the borehole at each point of the grid. This trace with no migration is representative of the mean reflectivity of the interfaces at the surface illuminated by the reflected waves, called the Fresnel area.

According to the invention, the emission of seismic waves into the earth is repeated at each borehole at different dates and the low coverage zero offset 0-phase traces obtained for the different dates are compared, correcting travel time variations due to seasonal changes in the surface weathered zone of said traces and calculating amplitude and travel time differences for the respective reflections on said traces in the earth to obtain information on the displacement of the fluids in the reservoir under study.

The boreholes used in accordance with the invention mean that the buried receivers can be left in place so that they are available and accessible for each survey, even if the survey dates are several months or even several years apart. Repetitive monitoring by the method in accordance with the invention does not require the repositioning or the immobilization of numerous receivers as with surface seismic methods. By using its own dedicated vertical arrays of receivers repetitively, the method in accordance with the invention achieves spatial and temporal sampling of the reservoir at intervals determined by the complexity of the reservoir, the rate of displacement of the fluids and the available budget. The proposed method, which assumes the provision of shallow boreholes equipped with receivers, is of lower cost than the repetitive continuous profiles required by prior art surface seismic methods. Note that in accordance with the invention the use of a vertical array of buried receivers produces seismic traces having a high signal to noise ratio and good vertical resolution, in particular thanks to the vertical filtering of surface effects and to the location of the device under the surface weathered zone.

Note further that in accordance with the invention the processing of the acquired seismic data includes a step of level by level deconvolution of the reflected waves by a direct wave, producing reflections whose amplitude is representative of the reflectivity of the earth on a vertical line through the borehole. This advantageous and novel processing step goes directly against the received wisdom of the man skilled in the art. Because the receivers are not deeply buried the reflected waves travel over a much longer path than the direct wave and the man skilled in the art might at first think that the operation of deconvolution of the one by the other would not yield a satisfactory result. In fact the deconvolution result is satisfactory because the direct and reflected waves are essentially shaped by their passage through the surface weathered zone.

In what the invention consists and how it may be put into practise will be clearly understood from the following description given by way of non-limiting example only with reference to the appended drawings.

BRIEF DESCRIPTION OF THE DRAWINGS

FIG. 1 is a perspective diagrammatic view of a slice of terrain partially cut away and showing an installation for implementing the method in accordance with the invention.

FIG. 2 is a detail view showing one borehole containing receivers for recording direct and reflected waves by a method in accordance with the invention for acquisition and processing of seismic data.

FIG. 3 is a diagram showing the direct and reflected seismic waves logged by each of the FIG. 2 receivers.

FIG. 4 shows the 0-phase trace obtained after processing for each of the FIG. 2 receivers.

FIG. 5 shows the low coverage zero offset 0-phase trace obtained after stacking the 0-phase traces obtained as shown in FIG. 4.

FIG. 6 shows the correspondence between this low coverage zero offset 0-phase trace obtained after processing for the FIG. 2 borehole and the values of the reflectivity of the interfaces of the sub-surface on a vertical line through the borehole.

FIG. 7 shows a typical different distribution of the fluids in the reservoir from FIG. 1 at two different dates.

FIG. 8 shows two seismic traces recorded on a vertical line through a borehole of the grid in FIG. 1 for the two dates of FIG. 7 after processing in accordance with the invention.

FIG. 9 shows a model of the variations in the parameters characteristic of the reflectivity of the FIG. 7 reservoir as a function of the water saturation in the reservoir.

DETAILED DESCRIPTION OF THE INVENTION

FIG. 1 shows by way of example a slice of terrain. Starting from the surface and travelling downwards towards the deep strata of the sub-surface, there are first a surface weathered zone 2 which extends to a depth of approximately 70 meters and then a reservoir 1 at a depth of around 1 200 meters containing fluids (not shown in the figure) such as water and gas, for example. The reservoir 1, seen edge-on, extends the full length of the slice of terrain shown. FIG. 1 also shows the recording of data by a method in accordance with the invention for acquisition and processing of seismic data with the aim of monitoring displacements of the fluids in the reservoir 1.

With reference to the acquisition of seismic data by this method, FIG. 1 shows that at each point A of a predetermined grid on the surface a shallow borehole 100 with a vertical axis U-U' is made in the earth above the reservoir 1. The points A of the grid are spaced by a greater or lesser distance, 250 to 500 meters in this example, in order to sample the reservoir 1 correctly. In this example, the grid comprises some 20 points A. Each borehole 100 of the grid extends from the surface to a depth of around 150 meters in a medium in which the seismic waves preferably propagate at a constant speed. This medium lies under the surface weathered zone 2. The boreholes 100 are uncased or contain a simple polyvinyl chloride casing, for example, and are drilled using conventional drilling machines employed to carry out upholes for measuring travel times in the near-surface strata. Each borehole 100 has a diameter of around 10 centimeters.

Referring to FIGS. 1 and 2, at least six to eight receivers 101, 102, 103, 104, 105, 106, 107, 108 are disposed in each borehole 100 along its vertical axis U-U'. Each is separately connected to the surface. The receivers are about 2 to 10 meters apart in the hole, depending on the velocity and frequency of the waves emitted into the medium surrounding the receivers. The receivers are lowered and cemented directly into each borehole 100 to fix them in the borehole. Each receiver is sealed in a box and is connected to one or more waterproof connectors at the surface in a manhole 110. As will be explained later, to carry out a measurement at a borehole the receivers of the borehole in question are separately connected to a seismic recorder 300 connected to the waterproof connector(s) in the manhole 110. The receivers are geophones or triphones, for example. For a compact arrangement the triphones may comprise three separate mini-sensors disposed in a plastic tube. Their orientation in the borehole may be determined relative to the direction of emission from the surface with a certain offset.

As shown in FIGS. 1 and 2, in a subsequent step of the method in accordance with the invention seismic waves are emitted into the earth at each borehole 100 by means of an emitter 200 placed on the surface (e.g. vibrator) or close to the surface (e.g. explosive) near the vertical axis U-U' of the borehole. In this example the source 200 is disposed about 20 meters from the vertical axis of the borehole in question. Each record is preferably based on a plurality of emissions, either from the same location to improve the signal to noise ratio or at progressively offset locations to obtain a collection of traces around the vertical axis U-U' of the borehole 100. However, the low depth at which the receivers are buried may restrict the effectiveness of the processing proposed at offsets from the borehole 100 which do not exceed the mean depth of the receivers (100 meters in this example).

Referring to FIGS. 2 and 3, a direct incident wave or downgoing wave 10 impinges directly on each of the receivers in the borehole 100. Upgoing waves 20 reflected from the interfaces of the earth, and in particular from the reservoir 1 with the fluids, also impinge on each receiver. The waves are recorded separately by the seismic recorder 300.

Thus each emission or group of emissions at each borehole provides one or more seismic records at a given date, used to measure the reflectivity of the earth on a vertical line through each borehole. The record(s) obtained at a given date for each borehole are processed by the method in accordance with the invention. Note that in the context of repetitive monitoring the dates at which the seismic data is logged may be several months or even several years apart.

The processing steps of the method in accordance with the invention will now be described for an emission near a hole and with particular reference to FIGS. 4, 5 and 6.

The direct incident (first break) waves 10 are picked in order to measure the travel time of these waves to the various receivers in each borehole. These times are then used in two ways: they are added to the arrival times of the various reflected waves 20, the effect of which is to horizontalize them; they are used to identify and correct seasonal variations of velocity in the surface weathered zone. The upgoing (reflected) waves 20 and the downgoing (direct) waves 10 are then separated by frequency and wave-number dependent filtering, knowing that said upgoing and downgoing waves do not have the same apparent velocity. The upgoing or reflected waves 20 are then deconvoluted receiver by receiver by the downgoing or direct wave 10 impinging on the receiver in order to obtain a 0-phase trace 30 for each receiver as shown in FIG. 5. These 0-phase traces show reflections whose travel times and maximal or minimal amplitudes are proportional to the depth and to the reflectivity of the various interfaces of the sub-surface and are independent of surface conditions after correction of the variations. Successful deconvolution assumes that the upgoing waves 20 and downgoing waves 10 as they pass through the surface weathered zone are almost entirely shaped. This is the condition for the downgoing wave 10 to be representative of the upgoing waves 20 whose path under said weathered zone 2 is much longer than that of the downgoing waves 10. It is therefore the condition for successful deconvolution. In this example the downgoing waves travel around 100 meters and the upgoing waves around 2000 to 2500 meters. In the VSP method, in which the receivers are lowered into the borehole until they are near the reservoir, the path difference is much smaller.

Stacking the horizontalized 0-phase traces produces a low coverage zero offset 0-phase trace 40 as shown in FIG. 5. The new trace 40 is equivalent to the trace that would be obtained if the waves propagated along the vertical axis of said borehole. FIG. 6 shows the correspondence between this zero offset 0-phase trace 40 and the reflectivity $R_1$, $R_2$ of the deep interfaces of the sub-surface around the borehole 100 in question. Note that using the acquisition and processing method described here it is possible simultaneously to compensate for seasonal changes in the travel time in the surface weathered zone by measuring delays relative to the downward waves 10 (marked as first breaks) and to allow for variations in emission amplitude by using deconvolution. In other words, all surface variations from one set of data to the next can be eliminated.

In the embodiment of the invention shown in FIGS. 1 through 6 the method of acquiring and processing seismic data provides a sampling of the reflectivity of the sub-surface according to the grid shown in FIG. 1 for a given date. By repeating the seismic emissions near the various boreholes 100 of the grid at spaced dates $J_1$ and $J_2$ and by comparing for each borehole the various zero offset 0-phase traces obtained by such processing this method provides a way to assess variations in the saturation of the fluids in the reservoir 1 distributed in a discrete manner.

Referring to FIG. 7, assume, for example, that the reservoir 1 contains two fluids 1a and 1b such as gas and water separated by a progressive transition which between dates $J_1$ and $J_2$ moves upward due to the production of gas. At date $J_1$ and on a vertical axis U-U' the reservoir 1 contains approximately 60% gas and 40% water. At later date $J_2$ and on the same vertical axis the gas/water saturations are interchanged because the transition area is higher. By applying the method as described with reference to FIGS. 1 through 5 at dates $J_1$ and $J_2$, and specifically by carrying out one or more emissions near each borehole of the grid at the dates $J_1$ and $J_2$, processing the recorded data and comparing the zero offset traces for each borehole, as described above, the FIG. 8 diagram for the borehole is obtained. This shows the variation $\Delta A$ of the maximal or minimal amplitudes proportional to the variation $\Delta R$ in the reflectivity of the reservoir interfaces on a vertical line through the borehole (and therefore the variation $\Delta Z$ in acoustic impedance), and a variation $\Delta t$ of travel time to the interface in question which represents a variation in seismic velocity in the reservoir through which the reflected waves 20 pass.

Theoretical diagrams of the kind, shown in FIG. 9 relate the variations in impedance $\Delta Z$ or velocity V measured on the basis of $\Delta A$ and $\Delta t$ to variations in fluid saturation and thus to displacements of the fluids.

The present invention is naturally not limited to the embodiment described and shown which the man skilled in the art may modify in numerous ways without departing from the scope of the invention.

For example, the method of acquiring and processing seismic data as described above may be carried out at sea. Each point of the grid would then be embodied in a vertical streamer comprising a plurality of hydrophones or groups of hydrophones suspended above the seabed and connected to an autonomous seismic recorder in a watertight sphere. The emissions are effected on a vertical line through the streamer from a seismic vessel which recovers the seismic recorder and receiver system after one or more data acquisitions.

There is claimed:

1. A method for obtaining a low coverage zero offset 0-phase trace of a displacement of fluids into an underground reservoir located in a sub-surface zone at a first depth below the earth's surface and below a surface weathered zone, comprising the steps of:

a) making a borehole extending from the earth's surface through the surface weathered zone into the sub-surface zone to a second depth less than the first depth of the reservoir at each point of a predetermined grid, b) positioning in each borehole below the surface weathered zone, along its vertical axis a plurality of fixed receivers, each receiver adapted to be connected separately to a corresponding seismic recorder on the surface, c) emitting a plurality of seismic waves into the earth within 100 meters of the borehole, d) detecting for each borehole by the receivers placed in said borehole a plurality of direct incident seismic waves and a plurality of seismic waves reflected at a plurality of interfaces of deep strata of the sub-surface, each receiver providing a separate record of the incident wave and a plurality of reflected waves, e) processing data detected from each borehole; wherein the step of processing further includes the steps of:
        picking a first break of direct incident waves,
        horizontalizing the reflected waves,
        separating the reflected waves and the direct incident waves,
        deconvoluting the reflected waves by the direct incident wave for each receiver in order to obtain a 0-phase trace for each receiver, and
        stacking the 0-phase traces from the receivers to obtain a low coverage zero offset 0-phase trace.

2. The method according to claim 1 wherein steps c)–e) are repeated at each borehole on different dates and said low coverage zero offset 0-phase traces corresponding to the different dates are compared, wherein the method further comprises the steps of correcting any variations in travel time related to seasonal changes in the surface weathered zone, and calculating amplitude and travel time differences at respective reflections on said traces in the sub-surface to obtain information on the displacement of the fluids in the reservoir.

* * * * *